(12) United States Patent
Ooki et al.

(10) Patent No.: US 8,466,217 B2
(45) Date of Patent: Jun. 18, 2013

(54) FLEXIBLE RESIN COMPOSITION AND SEALING PART FOR WATERPROOF CONNECTOR

(75) Inventors: Yuusaku Ooki, Shizuoka (JP); Hiroshi Hashimoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 404 days.

(21) Appl. No.: 12/530,915

(22) PCT Filed: Mar. 14, 2008

(86) PCT No.: PCT/JP2008/055197
§ 371 (c)(1),
(2), (4) Date: Feb. 3, 2010

(87) PCT Pub. No.: WO2008/111690
PCT Pub. Date: Sep. 18, 2008

(65) Prior Publication Data
US 2010/0144940 A1 Jun. 10, 2010

(30) Foreign Application Priority Data
Mar. 14, 2007 (JP) ................................. 2007-065024

(51) Int. Cl.
*C08K 5/20* (2006.01)
(52) U.S. Cl.
USPC .................................. 524/230; 524/232
(58) Field of Classification Search
USPC ...................................................... 524/230
See application file for complete search history.

(56) References Cited

U.S. PATENT DOCUMENTS
2003/0003315 A1* 1/2003 Takahata et al. ............. 428/516

FOREIGN PATENT DOCUMENTS

| | | |
|---|---|---|
| JP | 61-021177 | 1/1986 |
| JP | 62-252457 | 11/1987 |
| JP | 5-140374 | 6/1993 |
| JP | 05140374 A * | 6/1993 |
| JP | 5-295177 | 11/1993 |
| JP | 05295177 A * | 11/1993 |
| JP | 6-220270 | 8/1994 |
| JP | 2000-178451 | 6/2000 |
| JP | 2000178451 A * | 6/2000 |
| JP | 2002-195413 | 7/2002 |
| JP | 2003-41062 | 2/2003 |
| JP | 2003-183465 | 7/2003 |

OTHER PUBLICATIONS

Translation of JP05-140374, Jun. 1993.*
Translation of JP05-295177, Nov. 1993.*
Translation of JP2000-178451, Jun. 2000.*
Korean Office Action dated Aug. 19, 2011 with English translation.
Chinese Office Action dated Aug. 3, 2011 with English translation.

* cited by examiner

*Primary Examiner* — Hui Chin
(74) *Attorney, Agent, or Firm* — Morgan, Lewis & Bockius LLP

(57) ABSTRACT

To provide a sealing part for a waterproof connector, which can maintain good waterproof property and can also decrease the fitting force between the female connector housing and the male connector housing, using a thermoplastic resin having recyclability and excellent in productivity and workability. A flexible resin composition comprising 100 parts by weight of a polyester-based or polyolefinic elastomer having a Shore A hardness of 30 to less than 80 and 0.1 to 10 parts by weight of ethylenebisstearic acid amide or ethylenebisoleic acid amide; and a sealing part to be attached to a housing for waterproofing a connector, which is obtained by forming the above-mentioned flexible resin composition.

2 Claims, 2 Drawing Sheets

FLEXIBLE RESIN COMPOSITION AND SEALING PART FOR WATERPROOF CONNECTOR

TECHNICAL FIELD

The present invention relates to a sealing part for a waterproof connector and a flexible resin composition suitable for the above-mentioned sealing part for a waterproof connector.

BACKGROUND ART

Connectors used for connection of electrical circuits in motor vehicles are required to have high-degree waterproof sealing performance, so that a waterproof structure is employed. FIG. 1 is a cross sectional view showing one embodiment of a connector (waterproof connector) in which the waterproof structure is employed. In a female housing 3, a packing 1 is attached to an accommodating portion of a female metal terminal 7, and further, a portion through which an electric wire 9 connected to the female metal terminal 7 is led is sealed with a plug member 2. On the other hand, also in a male housing 4, a portion through which an electric wire 9 connected to a male metal terminal 8 is led is sealed with a plug member 2. Further, the packing 1 exhibits a ring shape, for example, as shown in FIG. 2.

An oil-bleeding NBR obtained by incorporating an aliphatic hydrocarbon oil into a butadiene-acrylonitrile copolymer (see patent document 1), an oil-bleeding silicone rubber material obtained by incorporating a silicone oil into a silicone rubber (see patent document 2) and the like are frequently used for sealing parts such as the packing 1 and the plug member 2. However, these rubber materials are thermoplastic, so that they are poor in recyclability. Accordingly, attention has recently given to thermoplastic resins having recyclability, and various studies have been made thereon.
[Patent Document 1] JP-A-61-21177
[Patent Document 2] JP-A-62-252457

DISCLOSURE OF THE INVENTION

The use of thermoplastic resins provides advantages of shortened forming process time, easy handling, excellent productivity and workability and decreased unit cost of sealing parts obtained, as well as recyclability. However, the resulting sealing parts are high in hardness and lack in flexibility, so that there are problems of increasing fitting force between a female connector housing and a male connector housing and moreover failing to maintain waterproof performance.

It is therefore an object of the invention to provide a sealing part for a waterproof connector, which can maintain good waterproof property and can also decrease the fitting force between the female connector housing and the male connector housing, using a thermoplastic resin having recyclability and excellent in productivity and workability.

The present inventors have studied flexibility and mechanical strength suitable as a sealing part for a waterproof connector, sealing property and permanent set property at high temperature and the like regarding various thermoplastic resins. As a result, it has been found out that a flexible resin composition obtained by incorporating ethylene bisstearic acid amide or ethylenebisoleic acid amide into a polyester-based or polyolefinic elastomer having a specific hardness is particularly excellent in these performances, thus attaining the present invention.

That is to say, the invention includes the following embodiments.
(1) A flexible resin composition comprising 100 parts by weight of a polyester-based or polyolefinic elastomer having a Shore A hardness of 30 to less than 80 and 0.1 to 10 parts by weight of ethylenebisstearic acid amide or ethylenebisoleic acid amide.
(2) A sealing part to be attached to a housing for waterproofing a connector, which is obtained by forming the flexible resin composition according to the above (1).

The sealing part for a waterproof connector, which is formed by the flexible resin composition of the invention, is rich in flexibility, and excellent in mechanical strength and in waterproof property and permanent set property at high temperature and the like, so that good waterproof property can be maintained. Fitting resistance is also small, because of its smooth surface. Further, it can be processed by injection molding, has extremely high mold efficiency and also has good workability. It is therefore extremely advantageous also in cost. Furthermore, it also has recyclability together because of its plasticity.

DESCRIPTION OF REFERENCE NUMERALS AND SIGNS

Figure 1:
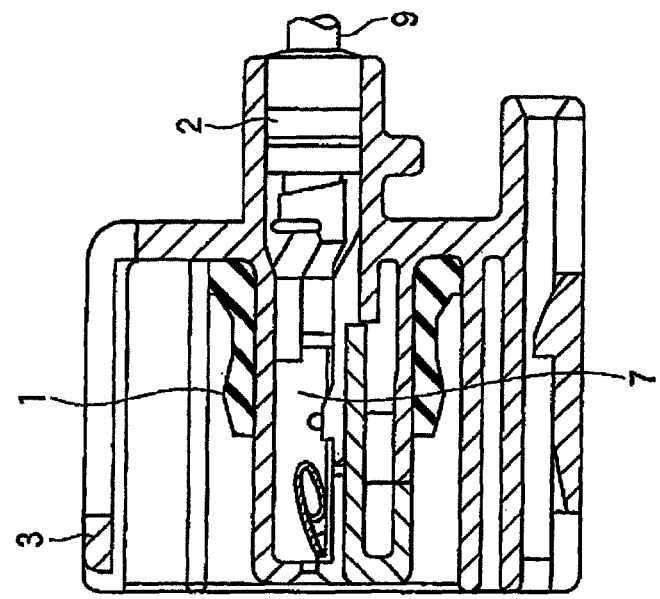
FIG. 1 is a cross-sectional view showing one embodiment of a waterproof connector.
Figure 1:
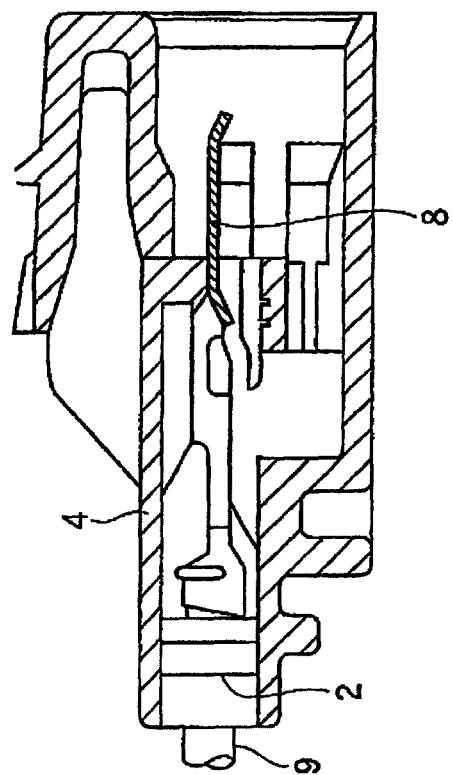

| | |
|---|---|
| 1 | Packing |
| 2 | Plug Member |
| 3 | Female Housing |
| 4 | Male Housing |
| 7 | Female Metal Terminal |
| 8 | Male Metal Terminal |
| 9 | Electric Wire |
| 10 | Water Tank |
| 11 | Air Pipe |

BEST MODE FOR CARRYING OUT THE INVENTION

The invention will be described in detail below.

The polyester-based elastomers having a Shore A hardness (measured with a type-A durometer according to JIS K-6253) of 30 to less than 80 used in the invention include a polyether-ester block copolymer of an aromatic dicarboxylic acid or an ester-forming derivative thereof and an aliphatic polyether, a polyester-ester block copolymer of an aromatic dicarboxylic acid or an ester-forming derivative thereof and an aliphatic polyester, and the like.

Further, as the polyolefinic elastomer having a Shore A hardness of 30 to less than 80, there can be used an elastomer comprising a block copolymer rubber mainly composed of a vinyl aromatic compound and a conjugated diene compound and polypropylene, an elastomer comprising an ethylene-propylene copolymer rubber and polypropylene, or the like.

The hardness of the above-mentioned polyester-based or polyolefinic elastomer is preferably from 40 to less than 70, and more preferably from 50 to less than 60, in the Shore A hardness. A Shore A hardness of 80 or more unfavorably results in insufficient flexibility to cause an increase in fitting force between the female connector housing and the male connector housing, whereas less than 30 unfavorably results in deterioration of forming proccessability of the sealing part.

For the mixing ratio of the above-mentioned polyester-based or polyolefinic elastomer and ethylenebisstearic acid amide or ethylenebisoleic acid amide, ethylenebisstearic acid amide or ethylenebisoleic acid amide is added in an amount of 0.1 to 10 parts by weight, preferably 0.2 to 5 parts by weight, more preferably 1 to 3 parts by weight, based on 100 parts by weight of the polyester-based or polyolefinic elastomer. When the mixing ratio of ethylenebisstearic acid amide or ethylenebisoleic acid amide is less than 0.1 part by weight, the fitting force between the male connector housing and the female connector housing unfavorably increases. In the case exceeding 10 parts by weight, the strength of the sealing part unfavorably decreases to cause deterioration of waterproof effect.

The sealing part for a waterproof connector of the invention is obtained by compounding and mixing the above-mentioned respective components, putting the resulting mixture in an injection molding machine for a thermoplastic resin, and injecting it into a mold cavity. In mixing, there is preferably used is a process of dry blending the raw materials in a mixing machine such as a mixer or a blender, and supplying the resulting mixture to an extruder, a Banbury mixer, a kneader or a roll machine to perform melt kneading.

EXAMPLES

The invention will be further explained below with reference to examples and comparative examples, but the invention should not be construed as limited thereby.

Example 1

Figure 2:
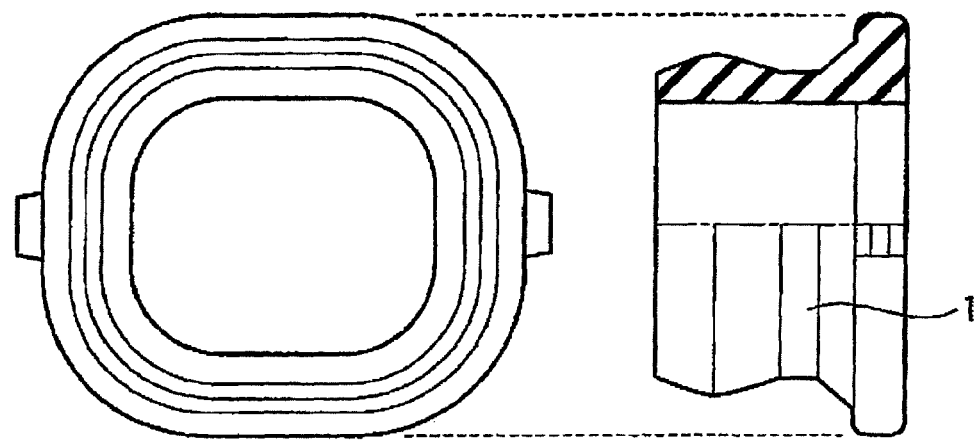
FIG. 2 is a top plan view and a partial cross-sectional view showing an embodiment of a packing attached to the waterproof connector shown in FIG. 1.

A resin composition obtained by melt kneading 100 parts by weight of a polyester-based elastomer having a Shore A hardness of 55 ("Premaloy A1500" manufactured by Mitsubishi Chemical Corporation) and 2 parts by weight of ethylenebisstearic acid amide ("Alflow H-50L" manufactured by NOF Corporation) at 200 to 220° C. using a twin screw extruder was put in an injection molding machine for a thermoplastic resin, plasticized at 220° C., and then, injected into a mold cavity to obtain a ring-shaped packing as shown in FIG. 2. Further, using the same resin composition, a plug member as shown in FIG. 1 was formed.

Example 2

A resin composition obtained by melt kneading 100 parts by weight of a polyester-based elastomer having a Shore A hardness of 55 ("Premaloy A1500" manufactured by Mitsubishi Chemical Corporation) and 2 parts by weight of ethylenebisoleic acid amide ("Alflow AD-281" manufactured by NOF Corporation) at 200 to 220° C. using a twin screw extruder was put in an injection molding machine for a thermoplastic resin, plasticized at 220° C., and then injected into a mold cavity to obtain a ring-shaped packing having the same shape as in Example 1. Further, using the same resin composition, a plug member as shown in FIG. 1 was formed.

Example 3

A resin composition obtained by melt kneading 100 parts by weight of a polyolefinic elastomer having a Shore A hardness of 35 (manufactured by AES Japan Ltd.) and 1 part by weight of ethylenebisstearic acid amide ("Alflow H-50L" manufactured by NOF Corporation) at 200 to 220° C. using a twin screw extruder was put in an injection molding machine for a thermoplastic resin, plasticized at 220° C., and then, injected into a mold cavity to obtain a ring-shaped packing having the same shape as in Example 1. Further, using the same resin composition, a plug member as shown in FIG. 1 was formed.

Example 4

A resin composition obtained by melt kneading 100 parts by weight of a polyester-based elastomer having a Shore A hardness of 71 ("Pelprene P30B" manufactured by Toyobo Co., Ltd.) and 2 parts by weight of ethylenebisstearic acid amide ("Alflow H-50L" manufactured by NOF Corporation) at 200 to 220° C. using a twin screw extruder was put in an injection molding machine for a thermoplastic resin, plasticized at 220° C., and then, injected into a mold cavity to obtain a ring-shaped packing having the same shape as in Example 1. Further, using the same resin composition, a plug member as shown in FIG. 1 was formed.

Comparative Example 1

A polyester-based elastomer having a Shore A hardness of 55 ("Premaloy A1500" manufactured by Mitsubishi Chemical Corporation) was put in an injection molding machine for a thermoplastic resin, plasticized at 220° C., and then, injected into a mold cavity to obtain a ring-shaped packing having the same shape as in Example 1. Further, using the same resin composition, a plug member as shown in FIG. 1 was formed.

Comparative Example 2

A polyolefinic elastomer having a Shore A hardness of 35 (manufactured by AES Japan Ltd.) was put in an injection molding machine for a thermoplastic resin, plasticized at 220° C., and then, injected into a mold cavity to obtain a ring-shaped packing having the same shape as in Example 1. Further, using the same resin composition, a plug member as shown in FIG. 1 was formed.

Comparative Example 3

A resin composition obtained by melt kneading 100 parts by weight of a polyester-based elastomer soft resin having a Shore A hardness of 80 ("Premaloy A1800" manufactured by Mitsubishi Chemical Corporation) and 2 parts by weight of ethylenebisstearic acid amide ("Alflow H-501," manufactured by NOF Corporation) at 200 to 220° C. using a twin screw extruder was put in an injection molding machine for a thermoplastic resin, plasticized at 220° C., and then, injected into a mold cavity to obtain a ring-shaped packing having the same shape as in Example 1. Further, using the same resin composition, a plug member as shown in FIG. 1 was formed.

Comparative Example 4

A resin composition obtained by melt kneading 100 parts by weight of a polyester-based elastomer soft resin having a Shore A hardness of 80 ("Premaloy A1800" manufactured by Mitsubishi Chemical Corporation) and 10 parts by weight of ethylenebisstearic acid amide ("Alflow H-501," manufactured by NOF Corporation) at 200 to 220° C. using a twin screw extruder was put in an injection molding machine for a thermoplastic resin, plasticized at 220° C., and then, injected into a mold cavity to obtain a ring-shaped packing having the same shape as in Example 1. Further, using the same resin composition, a plug member as shown in FIG. 1 was formed.

Comparative Example 5

Using a polyester-based elastomer and a polyolefinic elastomer, a flexible resin composition having a shore A hardness of 27 was prepared. A resin composition obtained by melt kneading 100 parts by weight of this flexible resin composition and 2 parts by weight of ethylenebisstearic acid amide ("Alflow H-50L" manufactured by NOF Corporation) at 200 to 220° C. using a twin screw extruder was put in an injection molding machine for a thermoplastic resin, plasticized at 220° C., and then, injected into a mold cavity to try to farm a ring-shaped packing having the same shape as in Example 1. However, it could not be formed.

Using each packing and plug member obtained in the above, the female housing and male housing shown in FIG. 1 were prepared, and further, the fitting force at the time when the female housing and male housing were fitted to each other was measured with a compressive stress measuring device (Autograph, manufactured by Shimadzu Corporation). The results thereof are shown in Table 1. When the fitting force was 47 N or less, it was judged to be acceptable (○), whereas when the fitting force was more than 47 N, it was judged to be unacceptable (x).

Figure 3:
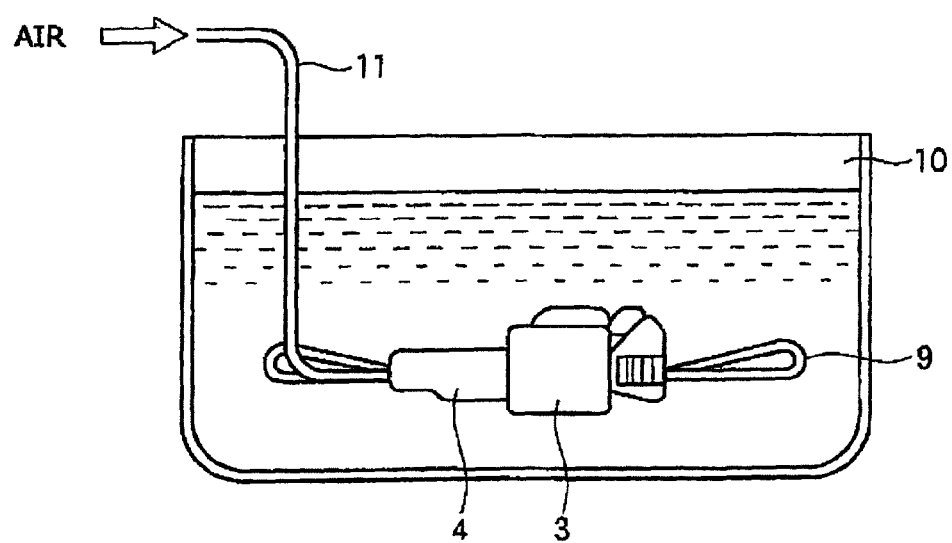
FIG. 3 is an illustration of a test method evaluating waterproof property.

Further, the female housing and male housing fitted to each other were subjected to thermal aging at 120° C. for 1,000 hours. Thereafter, as shown in FIG. 3, an air tube 11 was attached to a part of a plug member-mounted portion of the male connector housing, and the housings were immersed in water in a water tank 10 at a depth of 10 cm. Air of 9.5 kPa was supplied into the housings through the air pipe 11 for 30 seconds to examine the presence or absence of air leakage. When no air leakage was observed, the air pressure was further increased by 9.8 kPa to examine the presence or absence of air leakage or 30 seconds. When no air leakage occurred until the air pressure reached 100 kPa, it was judged to be acceptable (○), whereas when air leakage occurred before the air pressure reached 100 kPa it was judged to be unacceptable (x) (waterproof property 2). In parallel therewith, the same measurement was made without subjecting the housings to the thermal aging (waterproof property 1). The results thereof are also shown in Table 1.

TABLE 1

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| Formability | ○ | ○ | ○ | ○ | ○ | ○ | ○ | ○ | X |
| Connector Fitting Force | ○ (37 N) | ○ (39 N) | ○ (46 N) | ○ (46 N) | X (51 N) | X (63 N) | X (63 N) | X (63 N) | Unable to be measured (—) |
| Waterproof Property 1 | ○ | ○ | ○ | ○ | ○ | ○ | ○ | ○ | Unable to be measured |
| Waterproof Property 2 | ○ | ○ | ○ | ○ | ○ | X | X | X | Unable to be measured |

From Table 1, it is revealed that the use of the packings and plug members formed of the resin compositions according to the invention provides excellent waterproof property and can also decrease the fitting force. Further, injection molding is possible, and productivity thereof is also excellent.

The aforementioned embodiments merely illustrate representative modes of the invention and the invention should not be construed as being limited to the embodiments. That is, the invention can be implemented with various changes and modifications without departing from the gist of the invention.

This application is based on Japanese patent application No. 2007-065024 filed on Mar. 14, 2007, the entire contents thereof being hereby incorporated by reference.

INDUSTRIAL APPLICABILITY

According to the invention, it is possible to provide a sealing part for a waterproof connector, which can maintain good waterproof property and can also decrease the fitting force between the female connector housing and the male connector housing, using a thermoplastic resin having recyclability and excellent in productivity and workability.

The invention claimed is:

1. A flexible resin composition comprising 100 parts by weight of a polyester-based or polyolefinic elastomer having a Shore A hardness of 30 to less than 80 and 0.1 to 10 parts by weight of ethylenebisstearic acid amide or ethylenebisoleic acid amide.

2. A sealing part to be attached to a housing for waterproofing a connector, which is obtained by forming the flexible resin composition according to claim 1.

* * * * *